(12) United States Patent
Humer et al.

(10) Patent No.: US 7,891,734 B2
(45) Date of Patent: *Feb. 22, 2011

(54) CONNECTIONS FOR ACTIVE HEAD RESTRAINT SYSTEMS FOR VEHICLE SEATS

(75) Inventors: Mladen Humer, West Bloomfield, MI (US); Karl Schafer, Holly, MI (US); Paul Victor Pereira, Sterling Heights, MI (US); Marc Borlaug, Flint, MI (US); Dale Fox, Lincoln Park, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/714,695

(22) Filed: Mar. 1, 2010

(65) Prior Publication Data

US 2010/0156154 A1    Jun. 24, 2010

Related U.S. Application Data

(62) Division of application No. 12/119,713, filed on May 13, 2008, now Pat. No. 7,699,394.

(51) Int. Cl.
B60N 2/42     (2006.01)
(52) U.S. Cl. .................................. 297/216.12
(58) Field of Classification Search ............ 297/216.12, 297/391, 216.1, 408; 411/404; 16/2.1
See application file for complete search history.

(56) References Cited

U.S. PATENT DOCUMENTS

| | | | |
|---|---|---|---|
| 3,149,530 A | 9/1964 | Kolec | |
| 3,561,792 A | 2/1971 | Cycowicz | |
| 4,134,175 A | 1/1979 | Contoyanis | |
| 4,688,317 A | 8/1987 | Matuschek | |
| 4,958,971 A | 9/1990 | Lacey et al. | |
| 5,104,190 A | 4/1992 | Siegrist | |
| 5,143,500 A | 9/1992 | Schuring et al. | |
| 5,378,043 A | 1/1995 | Viano et al. | |
| 5,503,510 A * | 4/1996 | Golan | 411/43 |
| 6,224,310 B1 * | 5/2001 | Summerlin et al. | 411/34 |
| 6,250,714 B1 | 6/2001 | Nakano et al. | |
| 6,375,262 B1 | 4/2002 | Watanabe | |

(Continued)

OTHER PUBLICATIONS

International Search Report and Written Opinion for corresponding Application No. PCT/US2009/0407661, mailed Jun. 16, 2009, 8 pages.

Primary Examiner—Milton Nelson, Jr.
(74) Attorney, Agent, or Firm—Brooks Kushman P.C.

(57) ABSTRACT

A vehicle seat with an active head restraint system is provided with a seatback frame having a pair of side members. An armature extends transversely between the side members with a pair of lateral ends each pivotally connected to one of the side members. A head restraint rod extends from the armature for supporting a head restraint. An actuator is mounted to the seatback frame for actuating the armature. A bushing is mounted to the frame, the armature or the actuator. A rivet is mounted to the bushing and another of the frame, armature and actuator. The rivet preloads the bushing to minimize inadvertent movement at the connection. A method for assembling a vehicle seat is provided wherein the bushing is preassembled to the rivet. Another method for assembling a vehicle seat is provided wherein the rivet preloads the bushing to minimize inadvertent movement at the connection.

20 Claims, 4 Drawing Sheets

U.S. PATENT DOCUMENTS

| | | |
|---|---|---|
| 6,416,125 B1 | 7/2002 | Shah et al. |
| 6,991,287 B1 | 1/2006 | Ogawa et al. |
| 7,296,325 B1 | 11/2007 | Putumbaka et al. |
| 2004/0012234 A1 | 1/2004 | Yamaguchi et al. |
| 2004/0119324 A1 | 6/2004 | Humer et al. |
| 2006/0006709 A1 | 1/2006 | Uno et al. |
| 2006/0103190 A1 | 5/2006 | Humer et al. |
| 2008/0084098 A1 | 4/2008 | Humer et al. |

* cited by examiner

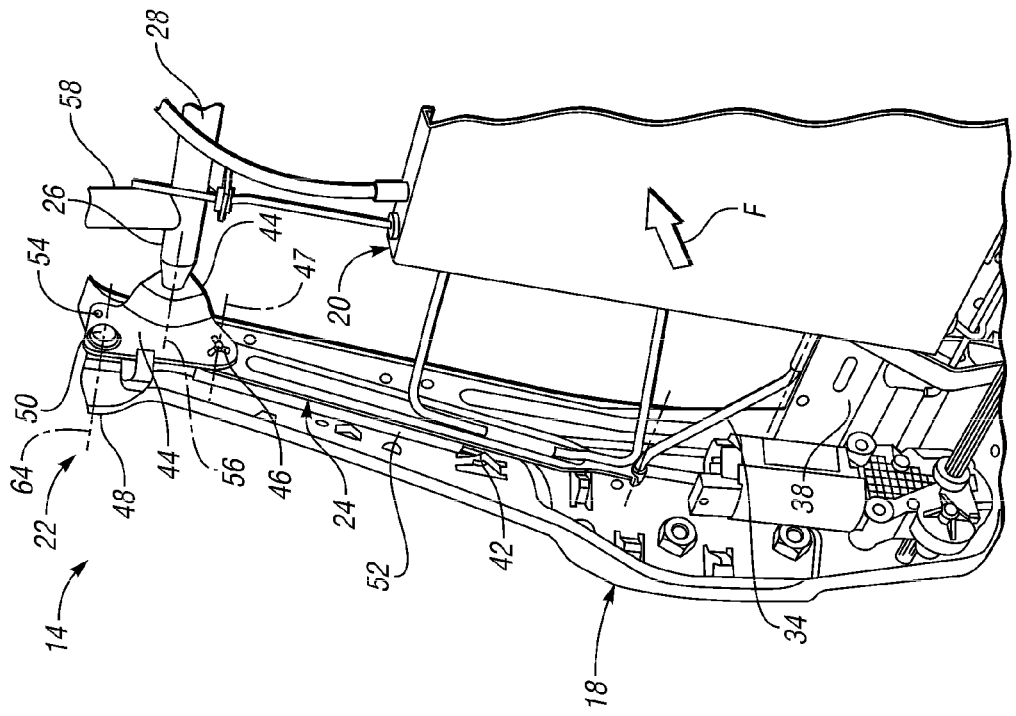
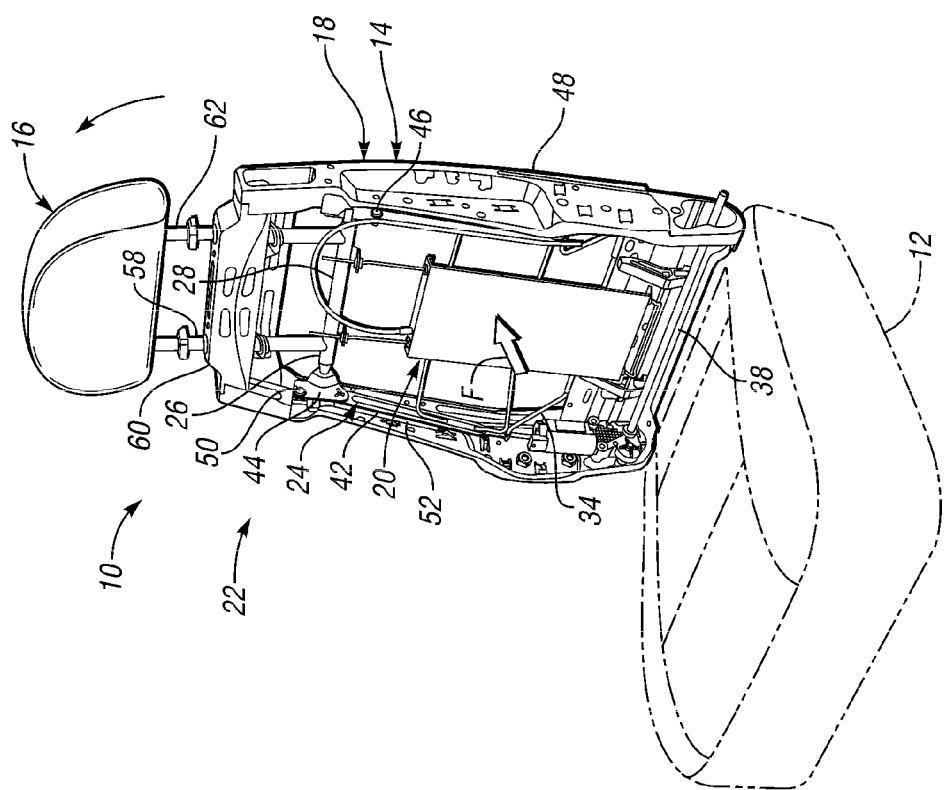

CONNECTIONS FOR ACTIVE HEAD RESTRAINT SYSTEMS FOR VEHICLE SEATS

CROSS-REFERENCE TO RELATED APPLICATIONS

This application is a division of U.S. application Ser. No. 12/119,713 filed May 13, 2008, now U.S. Pat. No. 7,699,394 B2, the disclosure of which is incorporated in its entirety by reference herein.

BACKGROUND

1. Technical Field

Embodiments of the invention relate to active head restraint systems for vehicle seats.

2. Background Art

Vehicle seats are provided with movable head restraints for moving to an impact position in response to an impact condition. One example of a vehicle seat having a movable head restraint is disclosed in U.S. Patent Application Publication No. 2006/0103190 A1, which published on May 18, 2006.

BRIEF DESCRIPTION OF THE DRAWINGS

FIG. 1 is a perspective view of a vehicle seat according to an embodiment of the present invention;

FIG. 3 is an enlarged perspective view of a portion of the vehicle seat of FIG. 1;

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 2:
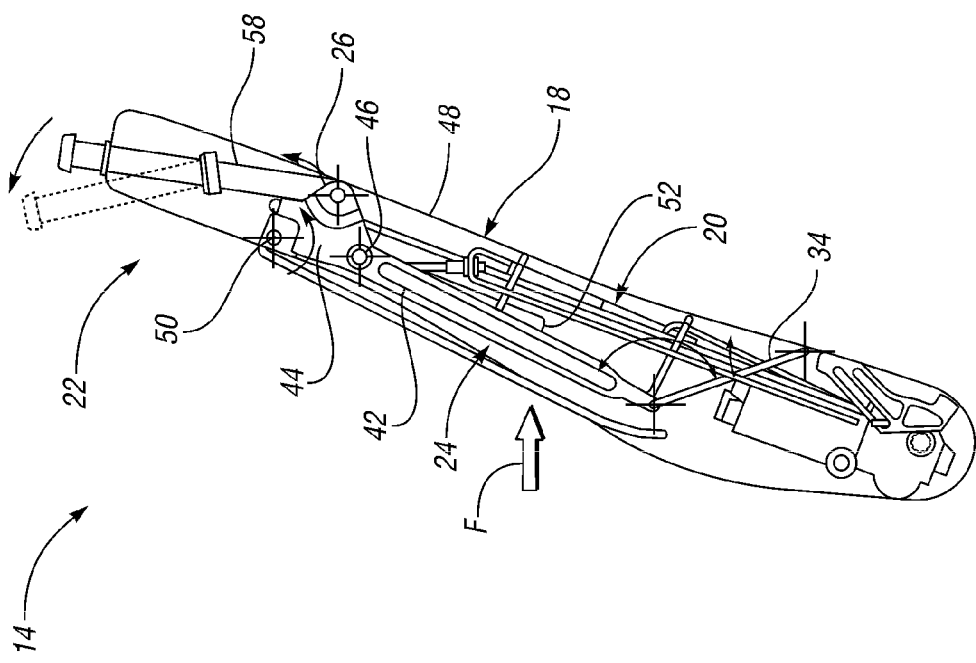
FIG. 2 is a front elevation view of the vehicle seat of FIG. 1.
Figure 4:
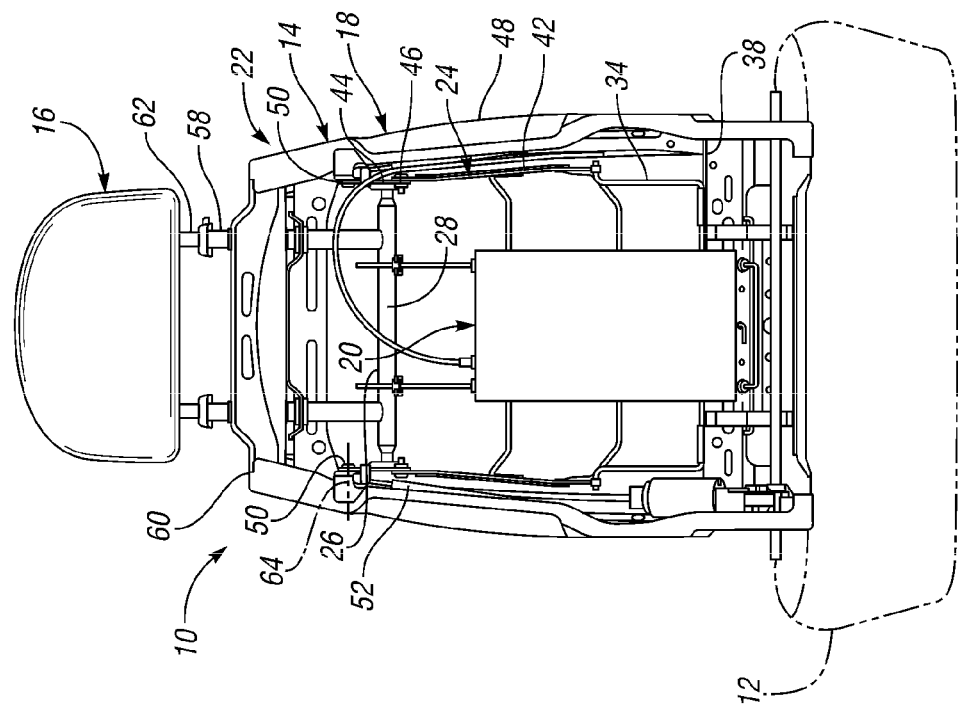
FIG. 4 is a fragmentary side elevation view of a portion of a vehicle seat of FIG. 1.

With reference now to FIGS. 1 and 2, a vehicle seat is illustrated according to an embodiment of the present invention and is reference generally by numeral 10. The vehicle seat includes a seat cushion 12 that is adapted to be installed within an interior of a vehicle, such as an automobile, aircraft, water craft, or the like, for seating an occupant. A seatback 14 is also installed in the vehicle for supporting the back of an occupant. The seatback 14 may be mounted directly to the vehicle or connected to the seat cushion 12. Although an individual seat 10 is depicted in FIG. 1, the invention contemplates any seat configuration, such as a bench seat, a split frame seat, a front row seat, a rear row seat, or the like.

The seat cushion 12 and the seatback 14 are both fabricated from suitable and known materials and manufacturing methods. For example, the seat cushion 12 utilizes a structural frame, foam for cushioning and a cover.

In the description, various embodiments, operating parameters and components of the embodiments are described with directional language, such as "above," "below," "upper," "lower," and words of similar import designate directions shown in the drawings or are understood in the field of the art. Such directional terminology is used for relative description and clarity and is not intended to limit the orientation of any embodiment or component of any embodiment to a particular direction or orientation.

The seatback 14 extends from the seat cushion 12. The seat 10 also includes a head restraint 16 extending above the seatback 14 for supporting the head of the occupant against the head restraint 16.

The seatback 14, which is illustrated with a cover and padding removed for depicting internal components, includes a frame 18 for providing a structural support for the seatback 14. The seatback 14 may include a lumbar support mechanism 20 for providing lumbar support to the occupant. The lumbar mechanism 20 may be an input for an active head restraint system 22. For example, the lumbar mechanism 20 may be connected to an actuatable mechanism, such as the linkage 24. Upon receipt of an impact to the lumbar mechanism 20, such as a body of the occupant that exceeds a predetermined force, the lumbar mechanism 20 may actuate the linkage 24. The output of the linkage 24 may be the head restraint 16, such that the head restraint 16 is moved forward and upward relative to the seatback 14, as illustrated by an arcuate arrow in FIG. 1. The lumbar mechanism 20 and the active head restraint system 22 are illustrated by way of example only. The invention contemplates utilization of any active head restraint system within the spirit and scope of the present invention. Although a mechanical active head restraint system is illustrated wherein a mechanical input force is utilized for actuating the head restraint 16, the invention contemplates active head restraints that actuate in response to a signal, such as the detection of an impact that is current or impending. The depicted active head restraint system 22 is a suitable example and is explained in further detail in U.S. application Ser. No. 11/538,485, which was filed on Oct. 4, 2006 by Mladen Humer et al., now U.S. Pat. No. 7,455,357 B2; the disclosure of which is incorporated in its entirety by reference herein.

The output of the linkage 24 includes an armature 26 with a transverse rod 28 that extends across the frame 18. The transverse rod 28 is connected to the linkage 24 for movement relative to the frame 18. The head restraint 16 is supported by the armature 26 and is actuated by the armature 26. With reference now to FIGS. 1-4, the linkage 24 is described in further detail. The linkage 24 may be a four-bar mechanism, such as a four-bar link mechanism as illustrated in the embodiment of FIGS. 1-4. The linkage 24 includes a lower link 34, which is pivotally connected to a lower cross bar 38 of the frame 18. A pair of coupler links 42 are each connected to the lower link 34. The coupler links 42 extend upward within the seat frame 18. In one embodiment, the lumbar mechanism 20 is mounted to the coupler links 42. An upper end of each coupler link 42 is pivotally connected to an upper link 44 at pivotal connection 46 about an axis 47 (FIG. 3). The pivotal connection 46 may be provided by a rivet assembly which will be discussed below. The upper links 44 are each pivotally connected to an upper region of side members 48 of the frame 18. A pivotal connection 50 of the upper links 44 is provided by a rivet assembly as will be discussed below.

The links 34, 42, 44 and the frame 18 collectively provide a four-bar mechanism, such as a four-bar linkage 24 for actuation of the active head restraint mechanism 22.

For the embodiment illustrated, an extension spring 52 is connected at one end to an intermediate region of the corresponding side member 48. An upper end of the extension spring 52 extends through an aperture 54 in the upper link 44 as illustrated in FIG. 3, which is offset from the pivotal connection 50 for urging the linkage 24 to a design position, which is illustrated in FIGS. 1-4.

The transverse rod 28 extends laterally across the frame 18 and is pivotally connected with both upper links 44 for pivoting about an axis 56 (FIG. 3), which is offset by a link provided linearly between the pivotal connection 46 of the upper link 44 and the coupler link 42 and the pivotal connection 50 provided by the upper link 44 and the frame 18. The transverse rod 28 interconnects both lateral sides of the linkage 24 for uniform actuation.

A pair of receptacles 58 extend upward from the transverse bar 28 and extend through an upper crossbar 60 of the frame 18. The receptacles 58 receive a pair of rods 62 therein, which support the head restraint 16 above the seatback 14. The receptacles 58 each cooperate with the upper crossbar 60 for linear movement relative to the upper crossbar 60 and to pivot about the armature 56 relative to the upper crossbar 60.

During an impact condition, the seatback 14 may receive a force of the occupant against the seatback 14. The head restraint mechanism 22 actuates the head restraint 16 from the design position to an actuated position to orient the head restraint 16 higher relative to the seatback 14 and closer to the head of an occupant in order to reduce injury to the occupant. The input force to the head restraint mechanism 22 is illustrated by the arrow F in FIGS. 1, 3 and 4. This force F may be generated, for example, when the vehicle impacts another object thereby accelerating the seat 10 into the occupant. Such an impact condition may be generated from an impact, such as a rear impact. Likewise, the impact condition may be generated from a forward impact wherein the occupant rebounds from a seat harness or other mechanism, into the seat. If the force F of the occupant exceeds a predetermined force to overcome the bias of the extension spring 52, then the active head restraint mechanism 22 actuates.

It is common for active head restraint mechanisms such as the active head restraint mechanism 22 to be preassembled prior to installation into a seat frame such as the seat frame 18. The primary connection of the active head restraint system 22 to the seat frame 18 is at the pivotal connection 50. In the prior art, it is common to utilize a shoulder bolt for this connection with a bushing in the upper link 44 for reducing friction. In order to fasten the shoulder bolt, a nut is required on the other side of the side member 48. Thus, the nut is typically welded or staked to the seat frame 18, which requires alignment with the shoulder bolt as the shoulder bolt is installed. In order to simplify the assembly of the active head restraint mechanism 22 to the seat frame 18, a pair of rivet assemblies 50 can be utilized. The rivet assemblies 50 are aligned generally collinear so that the upper links 44 pivot about a common pivot axis 64 as illustrated in FIG. 2. By replacing the shoulder bolt and nut with a rivet assembly 50, weight and cost are reduced. Additionally, the rivet assembly 50 is more compact than the shoulder bolt and rivet, thereby optimizing the package.

The rivet assembly 50 may also replace any fastener connection in the active head restraint system 22. For example, pivotal connection 46 may be provided by a rivet assembly 46. If the lower link 34 were provided by a stamped member instead of formed wire, then a rivet assembly could be utilized for the pivotal connection.

Figure 5:
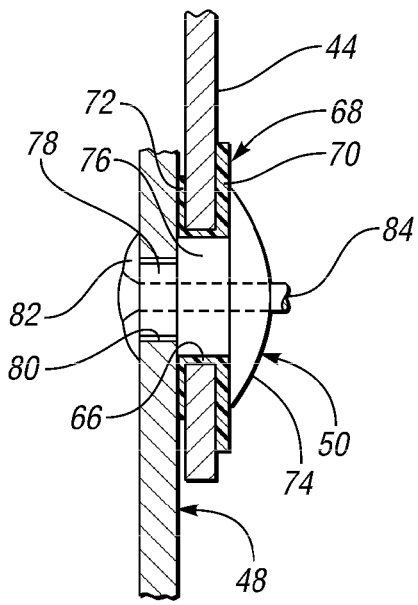
FIG. 5 is a partial section view taken through a fastener assembly for an active head restraint system of the vehicle seat of FIG. 1.

Referring now to FIG. 5, a rivet assembly 50 for one of the pivotal connections for the active head restraint system 22 is illustrated in greater detail. The pivotal connection is by way of example only, as the rivet assembly 50 may be utilized for any pivotal connection in the active head restraint system 22. For the example illustrated, an aperture 66 is provided through the upper link 44. A bushing 68 is installed in the aperture 66. The bushing 68 is formed of a polymeric material. Additionally, the bushing 68 includes flanges 70, 72 for retaining the bushing 68 upon the upper link 44 and for isolating the upper link 44 from the rivet assembly 50 and the side member 48 for reducing rattle or any undesirable sound at this connection.

The rivet assembly 50 depicted in FIG. 5 is a break-stem shoulder rivet having a head 74 with an enlarged diameter that engages the bushing 68 adjacent to the aperture 66. A shoulder 76 extends from the head 74 through the bushing 68. A sleeve 78 having a reduced diameter extends through an aperture 80 and the side member 48. The sleeve 78 has a deformable distal portion 82 that extends from the sleeve 78 on an outboard side of the side member 48. A stem 84 extends through the rivet assembly 50 and is connected to the deformable portion 82. Prior to installation, the deformable portion 82 has a diameter equivalent to that of the sleeve 78. Once installed, the stem 84 is translated inboard for extension from the head 74 thereby deforming the deformable portion 82 and fastening the link 44 to the side member 48. The stem 84 is translated by a rivet gun or the like which translates the stem 84 to the right in FIG. 5 and then breaks the stem 84 either by a shearing operation or by tension applied to the stem 84.

The rivet assembly 50 is installed in tension thereby preloading the bushing 68. In other words, the tension of the rivet assembly 50 presses the link 44, and consequently the bushing 68 against the side member 48. This preloading minimizes inadvertent movement at the pivotal connection. Additionally the polymeric bushing 68 prevents metal-to-metal contact. Further, the bushing 68 is under compression, thereby causing interference at the pivotal connection 50 that minimizes inadvertent pivotal movement. The preloading does not eliminate all pivotal movement because some may occur when an occupant is seated and resting against the target for the actuator. By way of example, an application of five-hundred pounds of tensile force to the rivet assembly 50 deforms the rivet assembly 50 in a controlled and predictable manner that adequately preloads the bushing 68. Undesirable sounds, such as buzz, squeak and rattle, can be avoided by minimizing inadvertent movement and preventing metal-to-metal contact.

Although the rivet assembly 50 is depicted in FIG. 5 for the pivotal connection between the upper link 44 and the side member 48, the invention contemplates other pivotal connections in the active head restraint system 22. As another example, the rivet assembly 50 can also be employed at the pivotal connection 46 for the upper link 44 and the coupler link 42. In this example, the preloading presses the coupler link 42 against the bushing 68 that is installed to the upper link 44. Although the rivet assembly 50 is illustrated and described in the context of active head restraint systems 22, the invention contemplates that the rivet assembly 50 can be employed in any seating connection wherein a small angular pivot range is required, inadvertent movement is to be minimized, or a compact packaging (such as elimination of a nut) is advantageous. One such example, is the installation of a cable to seat frame. The invention also contemplates utilization of the rivet assembly 50 for other automotive connections, such as a hinge on a small component like a glovebox.

It is common in the prior art to weld a bracket to the side member of the frame for the pivotal connection of the active head restraint system. The bracket provides a uniform thickness and facilitates alignment of the nut with the shoulder bolt. Thus, for replacing shoulder bolt assemblies of the prior art, the rivet assembly 50 is illustrated connected to a bracket, which is designated by numeral 48 and extends from the corresponding side member. However, by utilizing a rivet assembly 50, the bracket (48 in FIG. 5) can be removed from the frame 18 such that the rivet assembly 50 is connected directly to the side member 48 as illustrated in FIGS. 1-5.

Figure 6:
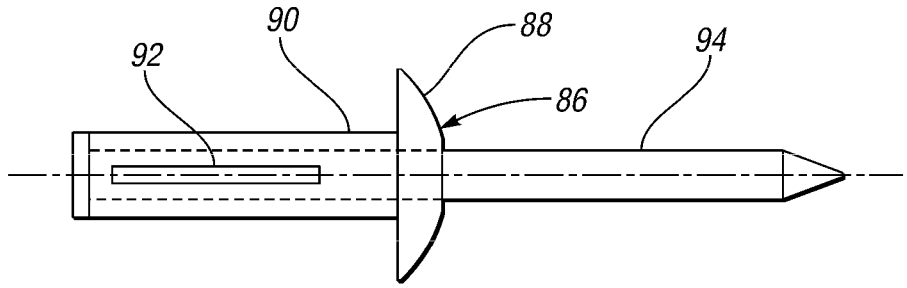
FIG. 6 is a side elevation view of a fastener according to another embodiment of the invention.

Referring now to FIG. 6, another rivet 86 is illustrated according to another embodiment of the present invention. The rivet 86 is a trifurcated rivet having a head 88 with a sleeve 90 extending therefrom. The sleeve 90 has a plurality of slots 92 formed through lateral sides of the sleeve 90 outboard of the side member 48 of the frame 18. A stem 94 extends through the head 88 and sleeve 90 and has an enlarged diameter at its distal end. Translation of the stem 94 causes the slotted region of the sleeve 90 to buckle and expand due to the weakened sections provided by the slots 92 thereby providing a second head to the rivet 86 and fastening the upper link 44 to the frame side member 48. The slots 92 are designed to provide predictable and controllable deformation with the desired compact connection and preload characteristics.

Figure 7:
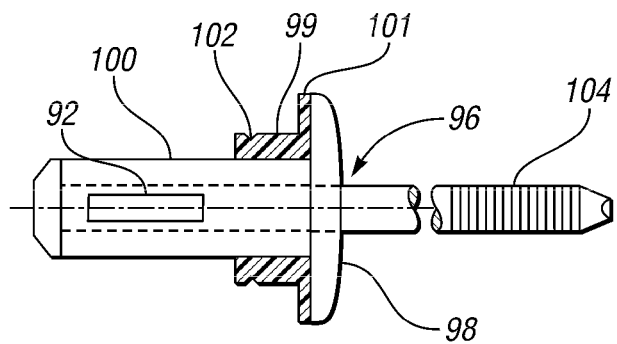
FIG. 7 is a side elevation view of a fastener according to yet another embodiment of the present invention.

FIG. 7 illustrates another rivet 96 having a head 98, a shoulder 99 and a sleeve 100. The shoulder 99 may be formed of a polymeric material to act as a bushing and may include a flange 101 and a groove 102. The bushing 99 may be preassembled to, or insert-molded onto the rivet 96 for retaining the bushing 99 prior to assembly to the associated seat components. The groove 102 permits deformation of the shoulder 99 to create a second flange for retention of the bushing 99 to an associated aperture. Alternatively, the shoulder 99 may be formed integrally with the rivet 96, which would obviate the flange 101 and groove 102 features. The sleeve 100 has a reduced thickness relative to the shoulder 99. A stem 104 has a free end that extends through the rivet 96 and has a fixed end with an enlarged diameter relative to that of the sleeve 100. Once installed, the stem 104 is translated to further extend the free end from the head 98. During this translation, the fixed end of the stem 104 expands the sleeve 100 thereby locking the sleeve 100 to the outboard side of the frame side member 48. The deformed sleeve 100 acts as a second head such that the upper link 44 is retained and pivotally connected to the side member 48. The sleeve 100 may also include slots 92 for weakening the sleeve and controlling the deformation of the sleeve 100.

Figure 8:
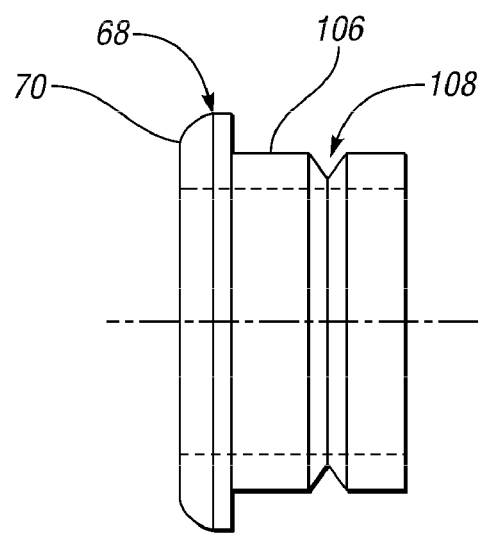
FIG. 8 is a side elevation view of a bushing of the fastener assembly of FIG. 5.
Figure 9:
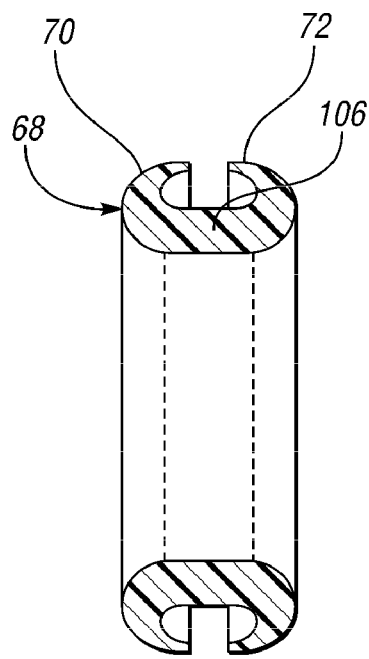
FIG. 9 is a section view of the bushing of FIG. 8 illustrated in an installed position.

Referring now to FIG. 8, the bushing 68 is illustrated prior to installation. The bushing 68 has a sleeve 106 extending from the flange 70. The sleeve 106 has an external diameter that is sized to be received within the aperture 66 of the upper link 44. A groove 108 is provided in the sleeve 106. Once the bushing 68 is installed into the aperture 66, the distal portion of the sleeve 106 is deformed such that it engages an outboard side of the upper link 44 providing the second flange 72 as illustrated in the installed orientation of FIG. 9.

The various rivet assemblies disclosed herein reduce the number of components and simplify the assembling operations of installing active head restraint systems into seat frames. The bushing 68 can be installed in the seat frame or to the rivet assembly prior to assembly. Thus, when the active head restraint system 22 is installed to the seat frame 18, the apertures 66, 80 are aligned and then the rivet assembly 50 is installed. The rivet assembly 50 permits a simplified fastening operation, which provides an adequate pivotal connection for the active head restraint system 22 relative to the seat frame 18. Additionally, the rivet assembly 50 minimizes inadvertent movement when the associated pivotal connection is in a design position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle subassembly comprising:
   a frame;
   a pivotal component pivotally connected to the frame;
   at least one bushing mounted to one of the frame and the pivotal component, the at least one bushing having a flange having a diameter that exceeds a diameter of an aperture formed in the corresponding frame and the pivotal component for abutment adjacent to the aperture, and a sleeve extending from the flange through the aperture, the sleeve having a distal portion being deformable such that after installation of the sleeve through the aperture, the distal portion is deformed to provide a second flange, thereby retaining the bushing to the aperture; and
   at least one rivet mounted to the other of the frame and the pivotal component at a pivotal connection with the bushing, the rivet extending through the sleeve of the bushing for collectively defining the pivotal connection, wherein the rivet preloads the bushing thereby minimizing inadvertent movement at the pivotal connection;
   wherein the frame comprises a seatback frame; and
   wherein the pivotal component further comprises a component of an active head restraint system.

2. The vehicle subassembly of claim 1 wherein the seatback frame is for supporting a back of an occupant, and the seatback frame comprises at least one cross member, and a pair of laterally spaced apart side members extending from the at least one cross member;
   wherein the pivotal component comprises:
      an armature extending transversely between the pair of side members, the armature having a pair of lateral ends, each pivotally connected to the seatback frame, the armature having at least one head restraint rod extending upright therefrom and out of the seatback frame, and
      an actuator operably connected to the seatback frame and operably connected to the armature for pivoting the armature from a design position to an actuated position in response to an impact condition, thereby actuating the head restraint from a design position to an actuated position, wherein at least one of the actuator connection with the seatback frame and the actuator connection with the armature is a pivotal connection; and
   wherein the vehicle subassembly further comprises a head restraint mounted to the at least one head restraint rod for supporting a head of an occupant.

3. The vehicle subassembly of claim 2 wherein the actuator further comprises a linkage, the bushing is mounted to a first aperture formed through a first link in the linkage, and the rivet is mounted to the bushing and a second aperture formed through a second link in the linkage.

4. The vehicle subassembly of claim 2 wherein the actuator further comprises a linkage, the bushing is mounted to a first aperture formed through a link in the linkage, and the rivet is mounted to the bushing and a second aperture formed through the seatback frame.

5. The vehicle subassembly of claim 2 wherein the lateral ends of the armature each further comprise a link that is pivotally connected to the corresponding side member;
   wherein the armature further comprises a transverse rod that is pivotally connected to each link offset from the rivet; and
   wherein the actuator is connected to the links for actuating the armature and the head restraint.

6. The vehicle subassembly of claim 5 wherein the actuator further comprises a linkage.

7. The vehicle subassembly of claim 2 wherein the at least one rivet further comprises a pair of rivets each extending laterally through one of the side members, the pair of rivets being generally collinear to provide a common pivot axis; and
   wherein the armature lateral ends are each pivotally connected to the corresponding rivet so that the armature pivots relative to the seatback frame.

8. The vehicle seat of claim 7 further comprising a pair of brackets each mounted to one of the pair of side members, each bracket having an aperture formed therethrough for receiving the corresponding rivet.

9. The vehicle subassembly of claim 2 wherein the bushing is mounted to a first aperture formed through a first one of the seatback frame, the armature and the actuator, and the rivet is mounted to the bushing and a second aperture formed through a second one of the seatback frame, the armature and the actuator.

10. The vehicle subassembly of claim 9 wherein the rivet further comprises:
    a head having a diameter that exceeds a diameter of the second aperture for abutment adjacent to the second aperture;
    a sleeve extending from the head, the sleeve being sized to extend through the second aperture and through the first aperture, with a deformable distal portion extending through the side member; and
    a stem having a fixed end mounted to the distal portion of the sleeve and a free end extending through the sleeve and the head such that after installation of the sleeve through the aperture in the corresponding side member, translation of the stem free end away from the head causes translation of the fixed end toward the head thereby deforming the distal portion of the sleeve to provide a second head for connecting the first one of the seatback frame, the armature and the actuator, to the second one of the seatback frame, the armature and the actuator.

11. The vehicle subassembly of claim 10 wherein each rivet is further defined as a break-stem rivet.

12. The vehicle subassembly of claim 10 wherein the distal portion of the rivet sleeve includes a plurality of slots that weaken the sleeve for buckling during assembly.

13. The vehicle subassembly of claim 10 wherein the rivet is further defined as a trifurcated rivet.

14. The vehicle subassembly of claim 10 wherein the distal portion of the sleeve of each rivet has a reduced thickness for expansion during assembly.

15. The vehicle subassembly of claim 10 wherein each rivet is further defined as a shoulder rivet.

16. A vehicle subassembly comprising:
    a seatback frame;
    a pivotal component of an active head restraint system pivotally connected to the seatback frame;
    at least one bushing mounted to one of the seatback frame and the pivotal component, the at least one bushing comprising:
        a flange having a diameter that exceeds a diameter of a first aperture formed in the corresponding seatback frame and the pivotal component for abutment adjacent to the aperture, and
        a sleeve extending from the flange through the first aperture; and
    at least one rivet mounted to the other of the seatback frame and the pivotal component at a pivotal connection with the bushing, the rivet comprising:
        a head having a diameter that exceeds a diameter of a second aperture formed in the corresponding seatback frame and the pivotal component for abutment adjacent to the second aperture,
        a sleeve extending from the head, the sleeve being sized to extend through the second aperture and through the sleeve of the bushing for collectively defining the pivotal connection, with a deformable distal portion, and
        a stem having a fixed end mounted to the distal portion of the sleeve and a free end extending through the sleeve and the head such that after installation of the sleeve through the second aperture, translation of the stem free end away from the head causes translation of the fixed end toward the head thereby deforming the distal portion of the sleeve to provide a second head for connecting the seatback frame and the pivotal component, and thereby preloading the bushing for minimizing inadvertent movement at the pivotal connection.

17. The vehicle subassembly of claim 16 wherein the bushing sleeve comprises a distal portion being deformable such that after installation of the sleeve through the first aperture, the distal portion is deformed to provide a second flange, thereby retaining the bushing to the aperture.

18. The vehicle subassembly of claim 16 wherein the seatback frame is for supporting a back of an occupant, and the seatback frame comprises at least one cross member, and a pair of laterally spaced apart side members extending from the at least one cross member;
    wherein the pivotal component comprises:
        an armature extending transversely between the pair of side members, the armature having a pair of lateral ends, each pivotally connected to the seatback frame, the armature having at least one head restraint rod extending upright therefrom and out of the seatback frame, and
        an actuator operably connected to the seatback frame and operably connected to the armature for pivoting the armature from a design position to an actuated position in response to an impact condition, thereby actuating the head restraint from a design position to an actuated position, wherein at least one of the actuator connection with the seatback frame and the actuator connection with the armature is a pivotal connection; and
    wherein the vehicle subassembly further comprises a head restraint mounted to the at least one head restraint rod for supporting a head of an occupant.

19. The vehicle subassembly of claim 16 wherein the distal portion of the rivet sleeve includes a plurality of slots that weaken the sleeve for buckling during assembly.

20. The vehicle subassembly of claim 16 wherein the rivet is further defined as a trifurcated rivet.

* * * * *